O. E. ANDERSON.
POWER MECHANISM.
APPLICATION FILED MAY 5, 1915.
1,235,952.
Patented Aug. 7, 1917.
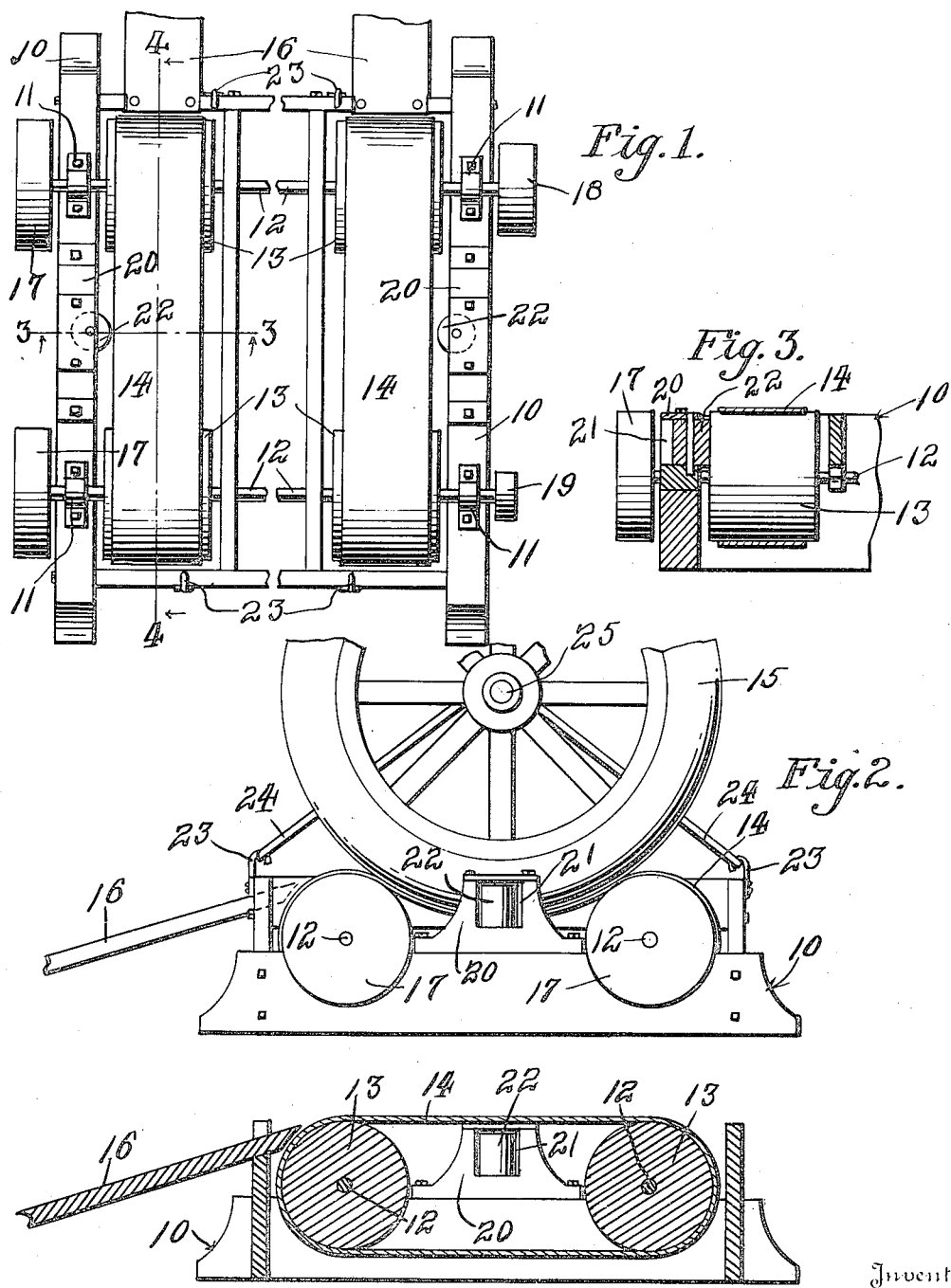
Fig. 1.
Fig. 3.
Fig. 2.
Fig. 4.
Witnesses
R. J. Williams
H. M. Test
Inventor
O. E. Anderson.
By 
Attorneys

UNITED STATES PATENT OFFICE.

OHMER E. ANDERSON, OF FORT WAYNE, INDIANA.

POWER MECHANISM.

1,235,952. Specification of Letters Patent. Patented Aug. 7, 1917.

Application filed May 5, 1915. Serial No. 26,041.

*To all whom it may concern:*

Be it known that I, OHMER E. ANDERSON, a citizen of the United States, residing at Fort Wayne, in the county of Allen, State of Indiana, have invented certain new and useful Improvements in Power Mechanisms; and I do hereby declare the following to be a full, clear, and exact description of the invention, such as will enable others skilled in the art to which it appertains to make and use the same.

This invention relates to new and useful improvements in power mechanisms and particularly to mechanisms utilizing the power of an automobile when it is not used on the road.

Another object is to provide a device of this character into which the rear wheels of an automobile are run, means being provided for taking the power from the mechanism for driving other machines.

Other objects and advantages will be apparent from the following description when taken in connection with the accompanying drawing; in which—

Figure 1 is a top plan view,

Fig. 2 is an end view of my improved power mechanism,

Fig. 3 is a transverse section on the line 3—3 of Fig. 1, and

Fig. 4 is a longitudinal sectional view on the line 4—4 of Fig. 1.

Referring particularly to the accompanying drawing, 10 represents a suitable frame, the end members of which are provided with bearing brackets 11 in which are mounted the parallel shafts 12. Mounted on each of the shafts adjacent its ends, but within the end member of the frame is a large and wide pulley 13. Engaged around this pulley are the broad belts 14 on which are supported the rear wheels 15 of the automobile.

At one side of the frame and in line with the belts 14 are inclined runways 16 which are adapted to serve as approaches for the automobile when running the same up to the belts 14. On the ends of the shafts 12 outside of the end members of the frame are the pulleys 17, 18 and 19, the pulleys 17 being heavy and serving as fly wheels while the pulleys 18 and 19 are adapted for use to transmit power to other machines. Formed centrally on each of the end members of the frame are vertically extending frames 20 each being formed with a recess 21 in its upper portion and having a vertical roller 22 mounted therein. These rollers bear against the side of the wheels 15 and prevent the automobile from shifting sidewise from the belts 14 and also, when the rear wheels are on the belts and the latter depressed, engage the outer edges of the belts to cause the wheels and belts to "track" evenly. At each end of the frame are the hooks 23 to which are secured the straps 24, the central portions of the straps being arranged over the rear axle 25 to hold the automobile against forward or backward movement from the belts.

What is claimed is:

A power transmitting device operable by the driving wheels of an automobile comprising a supporting frame, shafts mounted on the frame, pulleys carried by the shafts, belts engaged around the pulleys and arranged to support the wheels of an automobile, vertical members disposed outwardly of the belts and at points intermediate the said pulleys and vertically disposed rollers mounted in the said members for engagement with the sides of the automobile wheels to retain them in position on the belt and to engage with the outer edges of the belt when the belts are depressed by the automobile wheels.

In testimony whereof, I affix my signature, in the presence of two witnesses.

OHMER E. ANDERSON.

Witnesses:
JOHN N. PFEUFFUR,
LOUIS F. CURDES.

Copies of this patent may be obtained for five cents each, by addressing the "Commissioner of Patents, Washington, D. C."